(12) United States Patent
Isshiki et al.

(10) Patent No.: US 12,055,735 B2
(45) Date of Patent: Aug. 6, 2024

(54) ANTIGLARE FILM HAVING SPECIFIED SURFACE ROUGHNESS AND SURFACE INCLINATION

(71) Applicant: AGC Inc., Chiyoda-ku (JP)

(72) Inventors: Masanobu Isshiki, Tokyo (JP); Toru Ikeda, Tokyo (JP); Yosuke Takeda, Tokyo (JP); Takamichi Shimosaka, Tokyo (JP); Takaaki Murakami, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 1006 days.

(21) Appl. No.: 16/985,446

(22) Filed: Aug. 5, 2020

(65) Prior Publication Data
US 2020/0363571 A1 Nov. 19, 2020

Related U.S. Application Data

(63) Continuation of application No. PCT/JP2019/004077, filed on Feb. 5, 2019.

(30) Foreign Application Priority Data

Feb. 8, 2018 (JP) ................................ 2018-020733

(51) Int. Cl.
*B32B 7/023* (2019.01)
*G02B 1/11* (2015.01)
(Continued)

(52) U.S. Cl.
CPC .............. *G02B 5/0294* (2013.01); *G02B 1/11* (2013.01); *G02B 1/115* (2013.01); *G02B 5/0221* (2013.01);
(Continued)

(58) Field of Classification Search
CPC ................ B32B 7/023; B32B 2307/40; G02B 1/11–118; G02B 5/0221; G02B 5/0236;
(Continued)

(56) References Cited

U.S. PATENT DOCUMENTS 4,904,525 A 2/1990 Taniguchi et al.
4,940,602 A 7/1990 Taniguchi et al.
(Continued)

FOREIGN PATENT DOCUMENTS

CN 101685168 A 3/2010
CN 102221720 A 10/2011
(Continued)

OTHER PUBLICATIONS

International Search Report issued May 7, 2019 in PCT/JP2019/004077 filed Feb. 5, 2019, 1 page.

*Primary Examiner* — Ryan S Dunning
(74) *Attorney, Agent, or Firm* — Oblon, McClelland, Maier & Neustadt, L.L.P.

(57) ABSTRACT

A transparent substrate with an antiglare film, includes a transparent substrate having first and second main surfaces and an antiglare film formed on the first main surface. The antiglare film includes a low refractive index layer formed on the first main surface and a high refractive index layer formed in the low refractive index layer and having a refractive index different from that of the low refractive index layer. The low refractive index layer has $n_{low}$ of 1.4 to 1.8. The high refractive index layer has $n_{high}$ at least 0.1 higher than the $n_{low}$. The high refractive index layer has an area ratio of its portion where a surface inclination to the first main surface is 0.5° or less of 15% or less. An average length RSm of elements of a roughness curve of an outermost surface on a first main surface side is 50 μm or less.

17 Claims, 4 Drawing Sheets

(51) Int. Cl.
  *G02B 1/115* (2015.01)
  *G02B 5/02* (2006.01)
  *G02F 1/1335* (2006.01)

(52) U.S. Cl.
  CPC ......... *G02B 5/0236* (2013.01); *G02B 5/0284* (2013.01); *B32B 7/023* (2019.01); *B32B 2307/40* (2013.01); *G02F 1/133502* (2013.01); *G02F 1/133504* (2013.01); *G02F 2201/38* (2013.01); *G02F 2203/03* (2013.01)

(58) Field of Classification Search
  CPC ................ G02B 5/0284; G02B 5/0294; G02F 1/133502; G02F 1/133504; G02F 2201/38; G02F 2203/03
  See application file for complete search history.

(56) References Cited

U.S. PATENT DOCUMENTS

| | | | | |
|---|---|---|---|---|
| 8,163,372 | B2 * | 4/2012 | Furui | G02B 5/0242 428/689 |
| 2002/0150722 | A1 * | 10/2002 | Suzuki | C09D 7/20 428/323 |
| 2007/0266896 | A1 | 11/2007 | Suwa et al. | |
| 2008/0192353 | A1 * | 8/2008 | Nagahama | G02B 5/0226 359/599 |
| 2010/0079867 | A1 * | 4/2010 | Wakizaka | G02B 5/0221 359/601 |
| 2010/0079868 | A1 | 4/2010 | Asakura et al. | |
| 2010/0245714 | A1 | 9/2010 | Watanabe et al. | |
| 2012/0008206 | A1 * | 1/2012 | Haga | G02B 5/0221 428/206 |
| 2013/0242397 | A1 * | 9/2013 | Ogumi | G02B 5/0221 359/601 |
| 2017/0139082 | A1 | 5/2017 | Takai et al. | |
| 2018/0341049 | A1 * | 11/2018 | Serizawa | G02B 5/305 |

FOREIGN PATENT DOCUMENTS

| | | |
|---|---|---|
| JP | 64-001527 A | 1/1989 |
| JP | 2002-079616 A | 3/2002 |
| JP | 2003-4904 A | 1/2003 |
| JP | 2003-344608 A | 12/2003 |
| JP | 2010-237339 A | 10/2010 |
| JP | 2011-242759 A | 12/2011 |
| WO | WO 2005/121265 A1 | 12/2005 |
| WO | WO 2015/137196 A1 | 9/2015 |
| WO | WO 2016/021560 A1 | 2/2016 |

* cited by examiner

ANTIGLARE FILM HAVING SPECIFIED SURFACE ROUGHNESS AND SURFACE INCLINATION

TECHNICAL FIELD

The present invention relates to a transparent substrate with an antiglare film.

BACKGROUND ART

In an image display device (for example, a liquid crystal display, an organic EL display or a plasma display) provided on various instruments (for example, televisions, personal computers, smart phones, mobile phones and vehicles), when indoor lighting such as a fluorescent lamp and external light such as sunlight are reflected on a display surface, visibility is deteriorated by a reflected image.

A method of suppressing reflection of external light includes a method of providing an antiglare film on a display surface side of an image display device. The antiglare film has unevenness on the surface thereof and makes a reflected image blurred by diffuse-reflecting external light. The "diffuse reflection" means reflection reflected (scattered) at an angle different from incident angle to the surface in the reflection. Such an antiglare film is formed, for example, by applying a coating liquid containing a hydrolysable organic silicon compound such as a hydrolyzed condensate of alkoxysilane, as a silicon precursor on the surface of a light-transmitting substrate, and then baking (for example, see Patent Literature 1).

The method further includes a method of arranging a low reflection film on a display surface of an image display device, suppressing reflection itself of incident light to a transparent substrate, and making a reflected image blurred. A single layer film consisting of a low refractive index material, and a multilayer film including a combination of a layer consisting of a low refractive index material and a layer consisting of a high refractive index material are known as a low reflection film. Furthermore, a film formed from a fluorine-containing hydrolyzable organosilicon compound is also known as a low reflection film (for example, see Patent Literatures 2 to 5).

There is a method of indicating few flat parts under the condition of (H1−H2)/Ra≥0.25 as one of surface profile parameters for obtaining high resolution. The H1 is a height for 70% of the area ratio in a bearing curve for the roughness curve surface of the uneven surface, and the H2 is a height for 99% of the area ratio in a bearing curve for the roughness curve surface of the uneven surface (see Patent Literature 6).

CITATION LIST

Patent Literature

Patent Literature 1: WO2016/021560
Patent Literature 2: JP-A-64-1527
Patent Literature 3: JP-A-2003-344608
Patent Literature 4: JP-A-2002-79616
Patent Literature 5: WO2005/121265
Patent Literature 6: WO2015/137196

SUMMARY OF INVENTIONTECHNICAL PROBLEM

Deterioration of visibility of an image by reflection of external light on a display surface can be suppressed by arranging an antiglare film on a display surface of an image display device. However, at the same time, the antiglare film generates sparkle on the glare film surface as antiglare property is high, and visibility is deteriorated.

Furthermore, the requirements described in Patent Literature 6 indicate few flat parts in the bottom of unevenness, but the flat parts located on a high place in a height direction are not defined. However, regular reflection is generated on the flat parts located on the high place in the height direction. Therefore, it is insufficient in this definition to evaluate the ratio of flat parts by obtaining inclination of all parts.

Thus, the conventional technologies could not simultaneously achieve high antiglare property, high visibility and low sparkle.

An object of the present invention is to provide a transparent substrate with an antiglare film, which can simultaneously achieve high antiglare property, high visibility and low sparkle.

SOLUTION TO PROBLEM

To achieve the above object, the present invention provides a transparent substrate (1) with an antiglare film, comprising a transparent substrate having a first main surface and a second main surface, and an antiglare film formed on the first main surface,
  wherein the antiglare film includes a low refractive index layer formed on the first main surface of the transparent substrate and a high refractive index layer formed in the low refractive index layer and having a refractive index different from the refractive index of the low refractive index layer,
  the low refractive index layer has $n_{low}$ of 1.4 to 1.8 in which the refractive index of the low refractive index layer at a wavelength of 550 nm is $n_{low}$,
  the high refractive index layer has $n_{high}$ at least 0.1 higher than the $n_{low}$ in which the refractive index of the high refractive index layer at a wavelength of 550 nm is $n_{high}$,
  the high refractive index layer has an area ratio of its portion where a surface inclination to the first main surface of the transparent substrate of 0.5° or less is 15% or less, and
  an average length RSm of elements of a roughness curve of an outermost surface on a first main surface side of the transparent substrate with an antiglare film is 50 μm or less.

In the transparent substrate (1) with an antiglare film of the present invention, the high refractive index layer preferably has the refractive index $n_{high}$ at a wavelength of 550 nm of 1.8 or more.

In the transparent substrate (1) with an antiglare film of the present invention, the high refractive index layer preferably includes two or more layers.

In the transparent substrate (1) with an antiglare film of the present invention, visible light reflectance measured from the first main surface side with the second main surface of the transparent substrate blacked out is preferably 0.2 to 8%.

In the transparent substrate (1) with an antiglare film of the present invention, a value obtained by subtracting a total of an average value of reflectance (visible light reflectance) at a wavelength of 380 to 780 nm at an interface between the second main surface and the air and an average value of reflectance (visible light reflectance) at a wavelength of 380 to 780 nm at an interface between the first main surface and the air from an average value of reflectance (visible light reflectance) at a wavelength of 380 to 780 nm measured from the first main surface side is preferably 0.2 to 4%. The average value of reflectance (visible light reflectance) at a wavelength of 380 to 780 nm measured from the first main surface side is an actual measured value measured according to JIS R3106, and the average value of reflectance (visible light reflectance) at a wavelength of 380 to 780 nm at the interface between the second main surface and the air and the average value of reflectance (visible light reflectance) at a wavelength of 380 to 780 nm at the interface between the first main surface and the air are optically calculated values in a configuration of laminating on an ideally flat surface in the same thickness and the same product nk of a refractive index and an attenuation coefficient.

The present invention further provides a transparent substrate (2) with an antiglare film, comprising a transparent substrate having a first main surface and a second main surface, and an antiglare film formed on the first main surface,
  wherein the antiglare film includes a high refractive index layer formed on the first main surface of the transparent substrate and a low refractive index layer formed in the high refractive index layer and having a refractive index different from the refractive index of the high refractive index layer,
  the high refractive index layer has $n_{high}$ of 1.4 to 1.8 in which the refractive index of the high refractive index layer at a wavelength of 550 nm is $n_{high}$,
  the low refractive index layer has $n_{low}$ at least 0.1 lower than the $n_{high}$, in which the refractive index of the low refractive index layer at a wavelength of 550 nm is $n_{low}$,
  the low refractive index layer has an area ratio of its portion where a surface inclination to the first main surface of the transparent substrate of 0.5° or less is 15% or less, and
  an average length RSm of elements of a roughness curve of an outermost surface on a first main surface side of the transparent substrate with an antiglare film is 50 μm or less.

In the transparent substrate (2) with an antiglare film of the present invention, the low refractive index layer preferably has the refractive index $n_{low}$ at a wavelength of 550 nm of 1.4 or less.

In the transparent substrate (2) with an antiglare film of the present invention, the main component of the low refractive index layer is preferably silica.

In the transparent substrate (2) with an antiglare film of the present invention, the low refractive index layer preferably includes two or more layers.

In the transparent substrate (2) with an antiglare film of the present invention, visible light reflectance measured from the first main surface side with the second main surface of the transparent substrate blacked out is preferably 0.2 to 8%.

In the transparent substrate (2) with an antiglare film of the present invention, a value obtained by subtracting a total of an average value of reflectance (visible light reflectance) at a wavelength of 380 to 780 nm at an interface between the second main surface and the air and an average value of reflectance (visible light reflectance) at a wavelength of 380 to 780 nm at an interface between the first main surface and the air from an average value of reflectance (visible light reflectance) at a wavelength of 380 to 780 nm measured from the first main surface side is preferably 0.2 to 4%. The average value of reflectance (visible light reflectance) at a wavelength of 380 to 780 nm measured from the first main surface side is an actual measured value measured according to JIS R3106, and the average value of reflectance (visible light reflectance) at a wavelength of 380 to 780 nm at the interface between the second main surface and the air and the average value of reflectance (visible light reflectance) at a wavelength of 380 to 780 nm at the interface between the first main surface and the air are optically calculated values in a configuration of laminating on an ideally flat surface in the same thickness and the same product nk of a refractive index and an attenuation coefficient.

The present invention further provides a display device having a structure comprising the transparent substrate (1) or (2) with an antiglare film of the present invention as a cover member and a display panel adhered to the second main surface of the transparent substrate via an adhesive layer.

The present invention further provides a transparent substrate (3) with an antiglare film, comprising a transparent substrate having a first main surface and a second main surface, and an antiglare film formed on the first main surface,
  wherein the antiglare film includes a low refractive index layer formed on the first main surface of the transparent substrate and a high refractive index layer formed in the low refractive index layer and having a refractive index different from the refractive index of the low refractive index layer,
  the low refractive index layer has $n_{low}$ of 1.4 to 1.8 in which the refractive index of the low refractive index layer at a wavelength of 550 nm is $n_{low}$,
  the high refractive index layer has $n_{high}$ at least 0.1 higher than the $n_{low}$ in which the refractive index of the high refractive index layer at a wavelength of 550 nm is $n_{high}$, and
  in a cross-sectional SEM image, when lengths obtained by projecting portions where an inclination to the main surface is 0.5° or less in the high refractive index layer to a line parallel to the main surface of the transparent substrate are measured and these lengths are added up, a proportion of a total of the lengths to a width of 400 μm is 15% or less, an arithmetic mean roughness Ra obtained from a two-dimensional profile of the high refractive index layer is 0.01 μm or more and 0.4 μm or less, and an average length RSm of elements of a roughness curve of an outermost surface on a first main surface side is 0.8 μm or more and 50 μm or less.

ADVANTAGEOUS EFFECTS OF INVENTION

According to the transparent substrate with an antiglare film of the present invention, high antiglare property, high visibility and low sparkle can be simultaneously achieved.

DESCRIPTION OF EMBODIMENTS

The embodiments of the present invention are described in detail below by reference of the drawings.

First Embodiment

Figure 1:
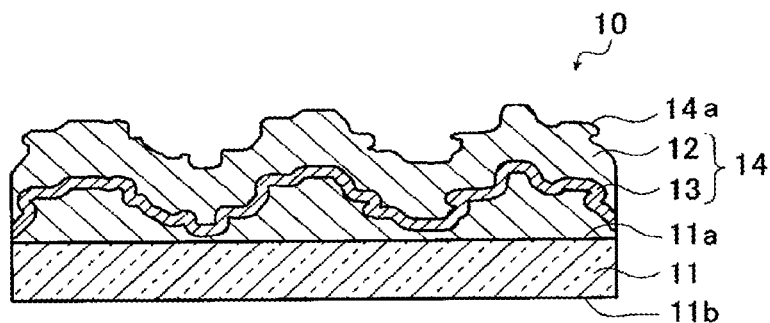
FIG. 1 is a cross-sectional view showing a first embodiment of the transparent substrate with an antiglare film of the present invention.

FIG. 1 is a cross-sectional view schematically showing a first embodiment of the transparent substrate with an antiglare film of the present invention. The transparent substrate 10 with an antiglare film shown in FIG. 1 includes a transparent substrate 11 having a first main surface 11a and a second main surface 11b, and an antiglare film 14 formed on the first main surface 11a.

[Transparent Substrate 11]

Examples of material of the transparent substrate 11 include a glass, a resin, etc. Examples of the resin include polyethylene terephthalate, polycarbonate, triacetyl cellulose and polymethyl methacrylate. Above all, the transparent plate is preferably a glass from the standpoints of safety and strength. Use of the glass in in-vehicle display member is preferred from the standpoints of high heat resistance and high weather resistance.

In the case where the transparent substrate 11 is the glass, strengthened glass which has been subjected to strengthening treatment is preferred in order to secure, for example, mechanical strength and scratch resistance necessary as the transparent substrate 10 with an antiglare film of an in-vehicle display member. Physically strengthening treatment and chemically strengthening treatment can be used as the strengthening treatment, but chemically strengthened glass by chemically strengthening treatment is preferred since even relatively thin glasses can be subjected to strengthening treatment.

Examples of the glass that can be used in the transparent substrate 11 include alkali-free glass and soda lime glass in the case where chemically strengthening treatment is not conducted. In the case where chemically strengthening treatment is conducted, examples of the glass include soda lime silicate glass, aluminosilicate glass, borate glass, lithium aluminosilicate glass and borosilicate glass. Aluminosilicate is preferred since large stress is easily provided by strengthening treatment even though a thickness is small, high strength glass is obtained even though the glass is thin, and such glass is suitable as an article to be arranged at the visual recognition side of an image display device.

In the transparent substrate 11, a maximum value of surface compressive stress (CS) is preferably 400 MPa or more, more preferably 500 MPa or more and still more preferably 600 MPa or more. The depth of a compressive stress layer (DOL) is preferably 10 μm or more. When the surface compressive stress and the depth of a compressive stress layer are in the above ranges, excellent strength and scratch resistance can be imparted to the main surface of the transparent plate.

The thickness of the transparent substrate 11 is preferably 0.3 mm or more and more preferably 0.5 mm or more. On the other hand, the thickness of the transparent substrate 11 is preferably 5 mm or less, more preferably 3 mm or less and still more preferably 2 mm or less. When the thickness is in this range, a final product can be made difficult to be cracked.

The transparent substrate 11 may have at least one bent part. Examples of shape of the transparent substrate include a shape of a combination of a bent part and a flat part and a shape of a bent part as a whole, but the shape is not particularly limited so long as a bent part is present. Recently, in the case of using the transparent substrate 10 with an antiglare film having a bent part for a display device, a display panel having a curved display surface appears in various instruments (televisions, personal computers, smart phones, car navigations and the like). The bent part can be prepared conforming to a shape of a display panel and a shape of a casing of a display panel. The "flat part" means the portion having the average radius of a curvature of more than 1000 mm, and the "bent part" means the portion having the average radius of a curvature of 1000 mm or less.

When refractive index of the transparent substrate 11 at a wavelength of 550 nm is $n_{sub}$, the $n_{sub}$ is preferably 1.45 to 1.62 and more preferably 1.45 to 1.55. When the refractive index is in this range, the transparent substrate is easily available as a glass plate or a resin plate that are mass-produced. The refractive index $n_{sub}$ of the transparent substrate 11 is preferably close to the refractive index of a low refractive index layer 12 described hereinafter. The reason for this is that regular reflection at the interface between the transparent substrate 11 and the low refractive index layer 12 is reduced as the difference in refractive index between the transparent substrate 11 and the low refractive index layer 12 is small. In the case where the transparent substrate 11 is a glass, when the refractive index $n_{sub}$ is equal to or higher than the lower limit, the glass has excellent strength, durability and weather resistance like high density silica glass.

The visual sensitivity is highest at a wavelength of 550 nm in a visible light wavelength region. Therefore, the refractive index used was the value at a wavelength of 550 nm.

[Antiglare Film 14]

Figure 4:
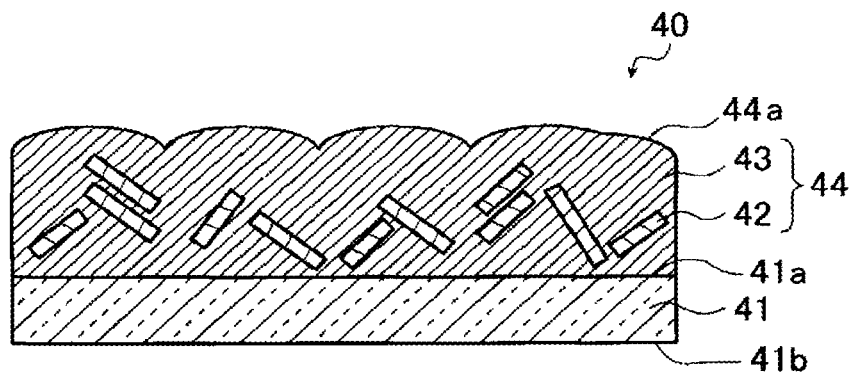
FIG. 4 is a cross-sectional view showing a fourth embodiment of the transparent substrate with an antiglare film of the present invention.

In the transparent substrate 10 with an antiglare film shown in FIG. 4, the antiglare film 14 consists of a low refractive index layer 12 formed on the first main surface 11a of the transparent substrate 11, and a high refractive index layer 13 formed in the low refractive index layer 12. The high refractive index layer 13 is a continuous layer.

In the present description, the continuous layer means a layer in a state that the surface of a base layer is completely covered and the base is not exposed after covering the layer. The state that the base is not completely exposed is preferred. However, even in the case where the base is slightly exposed by cracks, pinholes and the like of the film, the same effect is obtained and such a case is considered as a continuous layer.

In the transparent substrate 10 with an antiglare film shown in FIG. 1, one high refractive index layer 13 as the continuous layer is formed in the low refractive index layer 12 in the form of one layer. However, the high refractive index layer 13 may be formed in the form of two or more layers. Refractivity is easy to be optionally designed by film configuration by constituting the high refractive index layer 13 of two or more layers having different refractive index. Furthermore, when the high refractive index layer 13 has multilayered structure, wavelength dependency of reflectance is suppressed and reflected color can be designed into neutral color. The neutral color is also called achromatic color and means that the values of a* and b* are ±5 or less when color coordinates of reflected color when observed with illuminant D65 are expressed by CIE 1976 (L*.a* and b*) color space.

In the low refractive index layer 12 in the transparent substrate 10 with an antiglare film shown in FIG. 1, when the refractive index at a wavelength of 550 nm is $n_{low}$, the $n_{low}$ is 1.4 to 1.8. When the refractive index mow of the low refractive index layer 12 is in the above range, the difference to the refractive index $n_{sub}$ at a wavelength of 550 nm of the transparent substrate 11 on which the low refractive index layer 12 is formed is small and the problem such that the reflectance generated at the interface between the main surface 11a of the transparent substrate 11 and the low refractive index layer 12 increases does not occur. Furthermore, since the low refractive index layer 12 forms the interface with the air, the refractive index of the low refractive index layer 12 is preferably small as the range described above. The reason for this is that reflection at the air interface is reduced.

As a constituent material of the low refractive index layer 12 in which the refractive index $n_{low}$ at a wavelength of 550 nm satisfies the above range, silicon oxide (SiO$_2$), titanium oxide (TiO$_2$), niobium pentoxide (Nb$_2$O$_5$), tantalum pentoxide (Ta$_2$O$_5$), silicon nitride (Si$_3$N$_4$), alumina (Al$_2$O$_3$), aluminum nitride (AlN), zinc oxide (ZnO), tin oxide (SnO$_2$) and those mixtures can be preferably used.

In the high refractive index layer 13 in the transparent substrate 10 with an antiglare film shown FIG. 1, when the refractive index at a wavelength of 550 nm is $n_{high}$, the refractive index $n_{high}$ is at least 0.1 higher than the refractive index $n_{low}$. The reason for this is that reflection occurs at the interface by the difference in refractive index at the interface between the low refractive index layer 12 and the high refractive index layer 13, and as a result, internal reflection scattering increases. On the other hand, the antiglare film has a lamination configuration of low refractive index layer 12 (refractive index $n_{low}$)/high refractive index layer 13 (refractive index $n_{high}$)/low refractive index layer 12 (refractive index $n_{low}$), and incident light entered from the low refractive index layer 12 once refracts by the high refractive index layer 13. However, when light enters the low refractive index layer 12 from the high refractive index layer 13, the light refracts in a reverse direction of the first refraction, and as a result, the incident light hardly refracts (traveling direction does not change). For this reason, internal transmission scattering hardly increases. In other words, when the refractive index $n_{high}$ is at least 0.1 higher than the refractive index $n_{low}$, the effect of increasing reflection scattering by the increase of internal reflection scattering while suppressing the increase of internal transmission scattering, as compared with the case of only surface scattering. The effect can be evaluated by reflection image diffusiveness index R described hereinafter.

Light scattering is roughly classified into "surface scattering" and "internal scattering".

In the case of the structure having an interface having a difference in refractive index inside a set of the transparent substrate 10 with an antiglare film such as the transparent substrate 11 or the antiglare film 14 added to the surface of an image display element, the "internal scattering" means scattering generated depending on the interface shape in the interface, not the interface with the air. The internal scattering is classified into "internal transmission scattering" and "internal reflection scattering". The "internal transmission scattering" means scattering generated when transmitted light passes through the interface with particles contained having different refractive index or a layer, and visibility is deteriorated as the internal transmission scattering increases. The "internal reflection scattering" means scattering generated when incident light reflects at the interface with particles contained having different refractive index or a layer, and antiglare property increases as internal reflection scattering increases.

The difference between the refractive index $n_{high}$ and the refractive index $n_{low}$ is preferably 0.2 or more and more preferably 0.5 or more. The reason for this is that larger difference between the refractive index $n_{high}$ and the refractive index $n_{low}$ makes it easy to design any interface reflectance.

Furthermore, the difference between the refractive index $n_{high}$ and the refractive index $n_{low}$ is preferably 1 or less. The reason for this is to prevent too high reflectance at the interface between the low refractive index layer 12 and the high refractive index layer 13. The difference between the refractive index $n_{high}$ and the refractive index $n_{low}$ is more preferably 0.5 or less and still more preferably 0.3 or less.

Examples of constituent material of the high refractive index layer 13 in which the refractive index $n_{high}$ at a wavelength of 550 nm satisfies the above range include titanium dioxide (TiO$_2$), niobium pentoxide (Nb$_2$O$_5$), tantalum pentoxide (Ta$_2$O$_5$), silicon nitride (SiN), alumina (Al$_2$O$_3$), aluminum nitride (AlN), zinc oxide (ZnO), tin dioxide (SnO$_2$) and their mixtures. Furthermore, low refractive index material such as silicon oxide (SiO$_2$) may be contained so long as the refractive index $n_{high}$ is in a range satisfying the above range.

The refractive index $n_{high}$ is preferably 1.8 or more. The refractive index $n_{high}$ is more preferably 1.9 or more and still more preferably 2.0 or more.

The high refractive index layer 13 in the transparent substrate 10 with an antiglare film shown in FIG. 1 has few flat regions (regions where a surface of the high refractive index layer 13 is parallel to the first main surface 11a of the transparent substrate 11), more specifically, the portions having surface inclination to the first main surface 11a of the transparent substrate 11 of 0.5° or less. The present inventors have found that this configuration can achieve high antiglare property and high visibility. The antiglare property used herein means the performance of reducing glare of reflected light by reflection of light source by mainly scattering reflected light, and higher antiglare property can reduce glare. The visibility means the performance that in the case of a cover member for a display device, characters, figures and the like are clearly seen, and those are clearly seen as the proportion of reflected light scattered is small. In other words, characters, figures and the like can clearly be visually recognized as visibility is high.

In the present description, area ratio of the portion of the high refractive index layer 13 having surface inclination to the first main surface 11a of the transparent substrate 11 of 0.5° or less is used as an index of few flat regions. The area ratio is an area ratio in a two-dimensional projection shape obtained by projecting the high refractive index layer 13 on the first main surface 11a of the transparent substrate 11. Using the area ratio makes it possible to clearly define the shape of surface roughness that can achieve high antiglare property and high visibility.

The transparent substrate 10 with an antiglare film shown in FIG. 1 has the area ratio of the portion of the high refractive index layer 13 having surface inclination to the first main surface 11a of the transparent substrate 11 of 0.5° or less of 15% or less, and thus can achieve high antiglare property and high visibility.

(Area Ratio of Portion Having Surface Inclination to First Main Surface of Transparent Substrate of 0.5° or Less: Calculation Method 1)

In the high refractive index layer 13, the area ratio of its portion having surface inclination to the first main surface 11a of the transparent substrate 11 of 0.5 or less is obtained by the following procedures.

Observation area of (111 to 148) μm×(101 to 135) μm on the first main surface 11a having the antiglare film 14 formed thereon, of the transparent substrate 11 was subjected to XYZ measurement with an object lens of 100 magnifications using a laser microscope (model number: VK-X210, manufactured by Keyence). The number of sampling data is 2,048 horizontal×1,536 vertical, total 3,145,728. The observation area may vary depending on the conditions, as described above. The case of 145.0 μm×108.8 μm is described herein.

Figure 7:
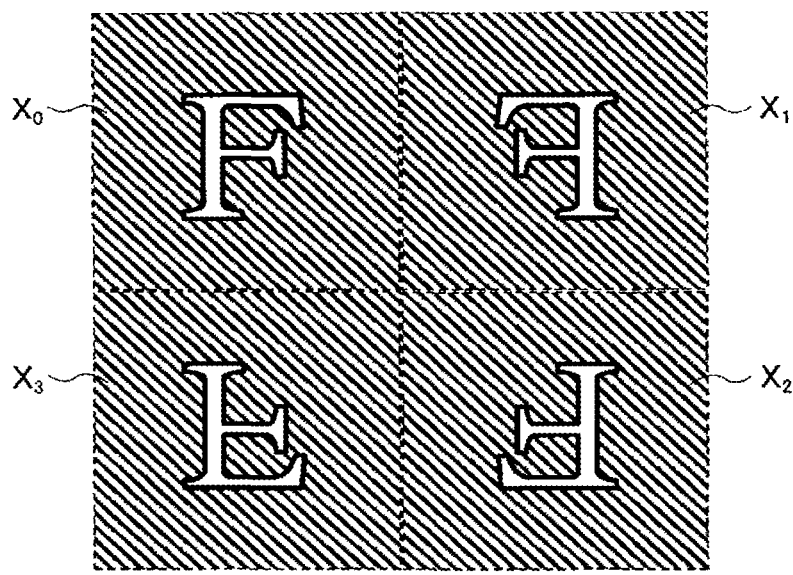
FIG. 7 is a schematic view explaining the arrangement of inverted and rotated data of square data.

Sampling data of 2,048 horizontal×1,536 vertical obtained above are provided, and data of (1,537 to 2,048) horizontal×1,536 vertical are deleted, thereby obtaining square data. Approximate plane of the square data obtained is obtained by least-squares method. Tilt correction is conducted by subtracting the approximate plane from the original data, thereby obtaining tilt correction square data $X_0$. Data $X_1$, $X_2$ and $X_3$ obtained by inverting and rotating the tilt correction square data obtained are arranged as shown in FIG. 7, thereby obtaining composite square data a of 3,072 horizontal×3,072 vertical.

A moving average filter is applied to the composite square data a obtained. Filter matrix that is square matrix of 25×25 and in which all elements are ⅕ is provided. The composite square data α and filter matrix are subjected to two-dimensional circular convolution processing, followed by filter processing, thereby obtaining composite square data 3,072×3,072. The composite square data after filter processing are linearly interpolated in two-dimension at ¼ intervals between the respective data points of 3,072 horizontal×3,072 vertical, thereby obtaining data after interpolation of 12,285 horizontal×12,285 vertical. The interpolation uses interp 2 function of MATLAB R2008b, a software manufactured by MathWorks. The interp 2 function includes a method designating an interpolation method, and "linear" is designated.

Subsequently, interpolated data are cut to LCD pixel size. The pixel of LCD assumes 264 ppi and a size of 96.2 μm×96.2 μm is prepared. 10,856 horizontal×10,856 vertical is cut out from the interpolated data (one side is calculated from 96.2/108.8×12,285). The data cut are linearly interpolated to 1,024 horizontal×1,024 vertical and again lined up as shown in FIG. 7, and inverted and rotated data are arranged, thereby obtaining composite square data β having 2,048 horizontal×2,048 vertical as a size of 384.8 μm×384.8 μm. The linear interpolation uses interp 2 function as same as above, and a method designates "linear".

The composite square data β having 2,048 horizontal×2,048 vertical as a size of 384.8 μm×384.8 μm obtained include data relating to a height. Furthermore, intervals of respective meshes are 384.8 μm/2,047=188 nm.

Surface inclination of the composite square data β having 2,048 horizontal×2,048 vertical as a size of 384.8 μm×384.8 μm obtained is calculated. Normal vector of the composite square data β is calculated using surfnorm function of MATALAB R2008b. Specifically, when the respective matrixes of X coordinate, Y coordinate and Z coordinate in each point of 2,048×2,048 points of the composite square data β are Xa, Ya and Za, normal vector at each point is determined when those are surfnorm (Xa, Ya, Za). An angle between normal vector at each point and normal vector of a glass-vertical surface is obtained, the angle is indicated in the form of histogram in units of 0.1°, the proportion of the total of angles=0 to 0.5° to the total in the form of histogram is calculated, and an area ratio of the portion having 0.5° or less is obtained.

(Area Ratio of Portion Having Surface Inclination to First Main Surface of Transparent Substrate of 0.5° or Less: Calculation Method 2)

Another example of obtaining a ratio of the portion having the surface inclination of 0.5° or less is described below.

Cross-sectional SEM image is photographed with 10,000 magnifications using ultrahigh resolution field emission type scanning electron microscope SUS8230 manufactured by Hitachi High-Technologies. Photographing conditions in this case are accelerated voltage: 2 kV, probe current: Normal, emission current: 10 μA, detector condition: LA100 (U). In the cross-sectional SEM image, the width of 10 μm length parallel to the main surface of a transparent substrate is observed, SEM images in which observation region has been continuously slid sideways are photographed, and 40 or more photographs obtained are arranged, making sampling length of 400 μm. Those cross-sectional SEM images are binarized using a binarization software. WinROOF 2015 (manufactured by Mitani Corporation) was used as the binarization software. The portion where contrast shape of the high refractive index layer binarized is parallel to the main surface of the transparent substrate, that is, the portion where the surface inclination to the main surface is 0.5° or less, is projected to a line parallel to the main surface of the transparent substrate and the length is measured. Lengths obtained by projecting the portions where the inclination to the main surface is 0.5° or less to a line parallel to the main surface of the transparent substrate are added up, and the proportion of lengths to width 400 μm is obtained. As a result, a ratio of the portion having the inclination of 0.5° or less is obtained.

In the high refractive index layer 13 of the transparent substrate 10 with an antiglare film shown in FIG. 1, the ratio of its portion having surface inclination to the first main surface 11a of the transparent substrate 11 of 0.5° or less is preferably 15% or less, more preferably 12% or less and still more preferably 8% or less.

In the present application, the values of arithmetic mean roughness: Ra and average length of elements: RSm obtained from two-dimensional profile of the high refractive index layer 13 obtained from cross-sectional SEM image of the transparent substrate 10 with an antiglare film can be used as an index of few flat regions in the high refractive index layer 13.

Cross-sectional SEM image is photographed with 10,000 magnifications using ultrahigh resolution field emission type scanning electron microscope SUS8230 manufactured by Hitachi High-Technologies. Photographing conditions in this case are accelerated voltage: 2 kV, probe current: Normal, emission current: 10 μA, detector condition: LA100 (U). In the cross-sectional SEM image, the width of 10 μm length parallel to the surface of a transparent substrate is observed, SEM images in which observation region is continuously slid sideways are photographed, and 40 or more photographs obtained are continuously arranged side by side, making sampling length of 400 μm. The cross-sectional SEM image is binarized using a binarization software. WinROOF 2015 (manufactured by Mitani Corporation) was used as the binarization software. Two-dimensional profile of the high refractive index layer 13 is digitalized from the binarized cross-sectional SEM image on the basis of a length scale simultaneously indicated, and Ra and RSm are obtained. The Ra and RSm are measured as reference length: 80 μm and evaluation length: 400 μm.

The Ra obtained from the two-dimensional profile of the high refractive index layer 13 is preferably 0.01 μm or more and 0.4 μm or less, more preferably 0.02 μm or more and 0.2 μm or less, and still more preferably 0.02 μm or more and 0.1 μm or less. When the Ra is equal to or more than the lower limit, regular reflection is decreased, and as a result, antiglare property is improved as compared with a transparent substrate with antiglare film, free of high refractive index layer and having the same surface roughness structure. When the Ra is equal to or less than the upper limit, in the case where the low refractive index layer is laminated on the high refractive index layer, roughness of the outermost surface does not become too large and scratch resistance is improved.

The RSm obtained from the two-dimensional profile of the high refractive index layer 13 is preferably 0.8 μm or more and 50 μm or less, more preferably 5 μm or more and 25 μm or less, and still more preferably 8 μm or more and 20 μm or less. When the RSm is less than 0.8 μm, the RSm is smaller than visible light wavelength edge and antiglare property is not expressed. When the RSm exceeds the upper limit, an angle of the surface of the high refractive index layer 13 comes close to be parallel to the first main surface 11a of the transparent substrate 11, and regular reflection increases. As a result, antiglare property is not improved as compared with a high refractive index layer-free transparent substrate with an antiglare film, having the same surface roughness.

A method of forming the high refractive index layer 13 having few flat regions in the low refractive index layer 12 includes the following procedures.

First of all, a low refractive index layer positioned lower than the high refractive index layer 13 is formed on the first main surface 11a of the transparent substrate 11 in FIG. 1. Wet depositing method such as a spin coating method, an electrostatic coating method or a spraying method, and a dry depositing method such as a vacuum deposition method, an ion beam assisted deposition method, an ion plating method, a sputtering method or a plasma CVD method can be used for the formation of the low refractive index layer. Of those, an electrostatic coating method can be particularly preferably used. The reason for this is that a coating liquid containing fine particles and a binder is used, surface uneven shape can be easily controlled and it is easy to form roughness surface having few flat regions.

Next, a so-called antiglare treatment is applied to the surface of the low refractive index layer formed, and fine roughness is formed on the surface of the low refractive index layer. The antiglare treatment used for this purpose is not particularly limited. Chemical treatment method involving etching treatment, such as so-called frost treatment, may be used, and physical treatment method such as a sandblast method may be used.

Next, the high refractive index layer 13 is formed on the low refractive index layer having fine roughness formed on the surface thereof. Wet deposition method such as a spin coating method or an electrostatic coating method can be used. However, dry deposition method such as a vacuum deposition method, an ion beam assisted deposition method, an ion plating method, a sputtering method or a plasma CVD method is preferably used for the following reasons.

The high refractive index layer 13 is required to be deposited in uniform thickness on the uneven shape of the low refractive index layer. In the dry depositing method, raw material particles come flying and adhere. Therefore, the raw material particles follow the uneven shape and are easily deposited in uniform thickness. Thus, the dry depositing method can be preferably used.

Next, low refractive index layer is formed on the high refractive layer 13. The procedures for forming the low refractive index layer on the high refractive layer 13 can use various film-forming methods as same as the procedures for forming low refractive index layer on the first main surface 11a of the transparent substrate 11, but a material of the low refractive index layer and a depositing method may be changed.

In the transparent substrate 10 with an antiglare film shown in FIG. 1, the thickness of the high refractive index layer 13 is not particularly limited, but is, for example, 5 to 80 nm.

As described above, two or more high refractive index layers 13 as a continuous layer may be formed in the low refractive index layer 12. The configuration having two or more high refractive index layers 13 as a continuous layer in the low refractive index layer 12 includes configuration having $TiO_2$ layer (thickness 11 nm), $SiO_2$ layer (thickness 28 nm) and $TiO_2$ layer (thickness 11 nm) formed in this order in the low refractive index layer 12.

As shown in FIG. 1, the low refractive index layer 12 formed on the high refractive index layer 13 also has fine unevenness on the surface thereof, and the outermost surface in the first main surface 11a side of the transparent substrate 10 with an antiglare film, that is, an outermost surface 14a of the antiglare film 14, has a shape having fine unevenness. In the present description, average length RSm of elements of a roughness curve is used as an index of surface shape of the antiglare film 14. As described above, the present inventors have found that when the high refractive index layer 13 has few flat regions and RSm of the outermost surface in the first main surface 11a side of the transparent substrate 10 with an antiglare film is small, this configuration can achieve high antiglare property and low sparkle.

RSm of the outermost surface (that is, outermost surface 14a of the antiglare film 14) in the first main surface 11a side of the transparent substrate 10 with an antiglare film shown in FIG. 1 is 50 μm or less. This configuration can achieve high antiglare property and low sparkle. The sparkle used herein means the degree that in the case of using a transparent substrate with an antiglare film in a cover material for a pixel matrix type display device, many particles of light having a period larger than that of a pixel matrix are observed and visibility is disturbed by this. Particles of light are difficult to be observed as sparkle is low, and visibility is improved.

The average length RSm of elements of a roughness curve of the outermost surface 14a on the antiglare film 14 can be measured can be measured according to the method defined in JIS B0601-2001.

RSm of the outermost surface in the first main surface 11a side of the transparent substate 10 having an antiglare film shown in FIG. 1 is preferably 30 μm or less and more preferably 20 μm or less. Furthermore, RSm of the outermost surface in the first main surface 11a side of the transparent substate 10 having an antiglare film shown in FIG. 1 is preferably 0.8 μm or more and more preferably 5 μm or more. When the RSm is less than 0.8 μm that is visible light wavelength end, scattering in visible light region is difficult to be developed and antiglare property is difficult to be developed.

Arithmetic surface roughness Ra of the outermost surface in the first main surface 11a side of the transparent substrate 10 (that is, outermost surface 14a of the antiglare film 14) is preferably 0.01 μm or more and 0.15 μm or less, more preferably 0.02 μm or more and 0.08 μm or less, and still more preferably 0.02 μm or more and 0.06 μm or less. When the Ra is equal to or more than the lower limit, regular reflection on the outermost surface in the first main surface 11a side of the transparent substrate 10 with an antiglare film does not excessively increase, and antiglare property is obtained while suppressing sparkle. When the Ra is equal to or less than the upper limit, uneven structure derived from the antiglare film, on the outermost surface in the first main surface 11a side of the transparent substrate 10 with an antiglare film can secure abrasion resistance.

Specifically, in the transparent substrate 10 with an antiglare film shown in FIG. 1, the high refractive index layer 13 has area ratio of its portion having surface inclination to the first main surface 11a of the transparent substrate 11 of 0.5° or less of 15% or less and RSm of the surface of the antiglare film 14 of 50 μm or less, and this can achieve high antiglare property, high visibility and low sparkle.

High antiglare property is obtained by providing the high refractive index layer 13. However, when reflectance is too high by providing the high refractive index layer 13, transparency of the transparent substrate 10 with an antiglare film is impaired. Therefore, visible light reflectance is preferably equal to or less than a predetermined value. The value obtained by subtracting the total of an average value of reflectance (visible light reflectance II) at a wavelength of 380 to 780 nm in the interface between the second main surface 11b of the transparent substrate 10 with an antiglare film or the transparent substrate 11 and the air and an average value of reflectance (visible light reflectance III) at a wavelength of 380 to 780 nm at the interface between the first main surface 11 side of the transparent substrate 10 with an antiglare film and the air from an average value of reflectance (visible light reflectance I) at a wavelength of 380 to 780 nm measured from the first main surface 11a side of the transparent substrate 10 with an antiglare film is preferably 0.2 to 4%. The average value of reflectance (visible light reflectance I) at a wavelength of 380 to 780 nm measured from the first main surface 11a side is the actual measured value measured according to JIS R3106. The average value of reflectance (visible light reflectance II) at a wavelength of 380 to 780 nm at the interface between the second main surface 11b and the air and the average value of reflectance (visible light reflectance III) at a wavelength of 380 to 780 nm at the interface between the first main surface 11a side and the air are optically calculated values in four layer configuration obtained by laminating a flat layer assumed to have the same film thickness and the same product nk of refractive index and damping coefficient as in the low refractive index layer 12, a flat layer assumed to have the same film thickness and the same product nk of refractive index and damping coefficient as in the high refractive index layer 13, and a flat layer assumed to have the same film thickness and the same product nk of refractive index and damping coefficient as in the low refractive index layer 12 on the surface of the ideally flat transparent substrate 11.

Furthermore, to eliminate reflection at the interface between the second main surface 11b of the transparent substrate 11 and the air, visible light reflectance obtained by sufficiently blacking out the second main surface 11b of the transparent substrate 11 and then measuring from the first main surface 11a side (visible side) using a spectrophotometer equipped with an integrating sphere is preferably 0.2 to 8%.

Second Embodiment

Figure 2:
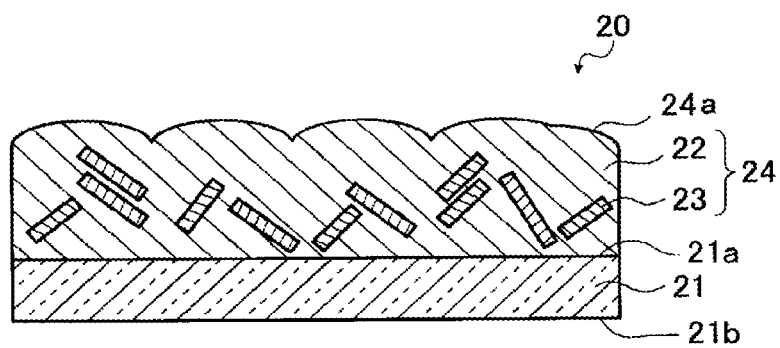
FIG. 2 is a cross-sectional view showing a second embodiment of the transparent substrate with an antiglare film of the present invention.

FIG. 2 is a cross-sectional view schematically showing the second embodiment of the transparent substrate with an antiglare film of the present invention. Transparent substrate 20 with an antiglare film shown in FIG. 2 includes a transparent substrate 21 having a first main surface 20a and a second main surface 20b, and an antiglare film 24 formed on the first main surface 21a. Description of configuration common to the first embodiment is omitted.

In the transparent substrate 20 with an antiglare film shown in FIG. 2, the antiglare film 24 consists of a low refractive index layer 22 formed on the first main surface 21a of the transparent substrate 21, and a high refractive index layer 23 formed in the low refractive index layer 22.

The high refractive index layer 23 in the transparent substrate 20 with an antiglare film shown in FIG. 2 is a discontinuous layer.

In the present description, the discontinuous layer means a layer in a state that the surface of a base layer is not completely covered and a part of the base is exposed after covering the layer.

In the transparent substrate 20 with an antiglare film shown in FIG. 2, the high refractive index layer 23 as a discontinuous layer is formed by dispersing flat plate-like high refractive index particles in the low refractive index layer 22 in the form of multiple layers.

In the low refractive index layer 22 in the transparent substrate 20 with an antiglare film shown in FIG. 2, refractive index $n_{low}$ at a wavelength of 550 nm is 1.4 to 1.8, as same as in the low refractive index layer 12 of the first embodiment. Constituent material of the low refractive index layer 22 having the refractive index $n_{low}$ satisfying the above range is the same as in the low refractive index layer 12.

In the flat plate-shaped high refractive index particles constituting the high refractive index layer 23 as a discontinuous layer in the transparent substrate 20 with an antiglare film shown in FIG. 2, refractive index $n_{high}$ at a wavelength of 550 nm is at least 0.1 higher than refractive index $n_{low}$ of the low refractive index layer 22, as same as in the high refractive index 13 of the first embodiment. Constituent material of the flat plate-shaped high refractive index particles having the refractive index $n_{high}$ satisfying the above range is the same as in the high refractive index layer 13.

The flat plate-shaped high refractive index particles are used as the high refractive index particles constituting the high refractive index layer 23 as a discontinuous layer in the transparent substrate 20 with an antiglare film shown in FIG. 2, in order to decrease high refractive index particles having surface inclination to the first main surface 21a of the transparent substrate 21 of 0.5° or less by forming the configuration that high refractive index particles have a main surface and dispersing the high refractive index particles in the low refractive index layer 22 in the state that the main surface has been inclined to the first main surface 21a of the transparent substrate 21. Therefore, the high refractive index particles only need to have a flat shape and include so-called scaly particles other than the flat plate-shaped particles exactly as described.

In the transparent substrate 20 with an antiglare film shown in FIG. 2, among the high refractive index particles constituting the high refractive index layer 2, area ratio of the high refractive index particles having surface inclination to the first main surface 21a of the transparent substrate 21 of 0.5° or less is 15% or less. Thus, the transparent substrate 20 with an antiglare film can achieve high antiglare property and high visibility.

The area ratio is area ratio in a two-dimensional projection shape obtained by projecting the high refractive index particles constituting the high refractive index layer 23 on the first main surface 21a of the transparent substrate 21.

In the case where the high refractive index layer 23 is a discontinuous layer, the area ratio is obtained by the following procedures.

A sample of the transparent substrate 20 with an antiglare film is prepared such that a cross-section in a thickness direction can be observed. Cross-section of particles in the sample was observed on the width of 100 μm in total using a scanning electron microscope SEM. The surface of the sample is coated with platinum in a thickness of 5 nm in order to prevent charge-up, and is observed using SEM. SEM can use FE-SEM (Model number S4300) manufactured by Hitachi, Ltd., and the sample is observed under the conditions of accelerated voltage: 5 kV and magnification: 50,000. Inclination angles to the first main surface 21a of the transparent substrate 20 of the entire particles that can be observed is measured from an observation image obtained by SEM and is displayed in the histogram, thereby obtaining an abundance ratio of portion having inclination angle of 0.5° or less. The abundance ratio is considered to be equivalent to an area ratio. Therefore, the abundance ratio is used as an area ratio of the portion having surface inclination of 0.5° or less.

In the transparent substrate 20 with an antiglare film shown in FIG. 2, among the high refractive index particles constituting the high refractive index layer 23, the area ratio of the high refractive index particles having surface inclination to the first main surface 21a of the transparent substrate 21 of 0.5° or less is preferably 15% or less, more preferably 12% or less and still more preferably 8% or less.

Examples of the flat plate-shaped high refractive index particles include flaky alumina ($Al_2O_3$) and scaly alumina ($Al_2O_3$). The flaky alumina includes flaky alumina primary particles and alumina secondary particles formed by orienting a plurality of flaky alumina primary particles such that face-to-face is parallel to each other and overlapping those. Examples of the scaly alumina include alumina primary particles and alumina secondary particles.

The thickness of the alumina primary particles is preferably 0.001 to 0.1 μm. When the thickness of the alumina primary particles is in the above range, scaly alumina secondary particles in which face-to-face is parallel to each other and one or a plurality of scaly primary particles are overlapped can be formed. A ratio of the minimum length to the thickness of the alumina primary particles is preferably 2 or more, more preferably 5 or more and still more preferably 10 or more.

The thickness of the alumina secondary particles is preferably 0.001 to 3 μm and more preferably 0.005 to 2 μm. A ratio of the minimum length to the thickness of the alumina secondary particles is preferably 2 or more, more preferably 5 or more and still more preferably 10 or more. The alumina secondary particles are preferably present independently to each other without fusion.

Average aspect ratio of the scaly alumina particles is preferably 30 to 200, more preferably 40 to 160 and still more preferably 50 to 120. When the average aspect ratio of the scaly alumina particles is equal to or more than the lower limit of the range, crack and peeling of the antiglare film are sufficiently suppressed even though the thickness is large. When the average aspect ratio of the scaly alumina particles is equal to or less than the upper limit of the range, dispersion stability in a coating composition is satisfactory in dispersing the high refractive index particles in the low refractive index layer 21 by the procedures described hereinafter.

The "aspect ratio" means a ratio of maximum length to thickness of particles (maximum length/thickness), and the "average aspect ratio" is an average value of aspect ratios of 50 particles randomly selected. The thickness of the particle is measured by atomic force microscope (AFM), and the maximum length is measured by transmission electron microscope (TEM).

Average particle diameter of the scaly alumina particles is preferably 50 to 500 nm and more preferably 100 to 300 nm. When the average particle diameter of the scaly alumina particles is equal to or more than the lower limit of the range, excellent low sparkle property is obtained. Furthermore, even though the thickness is large, crack and peeling of the antiglare film are sufficiently suppressed. When the average particle diameter of the scaly alumina particles is equal to or less than the upper limit of the range, haze is further decreased. Furthermore, dispersion stability in a coating composition is satisfactory in dispersing the high refractive index particles in the low refractive index layer in the procedures described hereinafter.

The average particle diameter of the scaly alumina particles is measured in the same manner as in the average particle diameter of spherical alumina particles.

Not only the scaly alumina particles, but amorphous alumina particles generated when producing the scaly alumina particles are sometimes contained in a powder or a dispersion. The scaly alumina particles are obtained by, for example, cracking and dispersing aggregate-shaped alumina tertiary particles (hereinafter sometimes referred to as alumina aggregates) having voids, formed such that scaly alumina particles flocculate and irregularly overlap. The amorphous alumina particles are in the state that alumina aggregates have been atomized to a certain extent, but are in the state that the alumina aggregates are not atomized up to individual scaly alumina particles, and have the shape that a plurality of scaly alumina particles form a bulk. In the case where amorphous alumina particles are contained, there is a possibility that denseness of the antiglare film formed is deteriorated and crack and film peeling are easy to occur. For this reason, smaller content of amorphous alumina particles in a powder or a dispersion is preferred.

The amorphous alumina particles and alumina aggregates are observed in black by TEM observation, and the flaky alumina primary particles or alumina secondary particles are observed in light black or semitransparent by TEM observation.

The scaly alumina particles may use commercially available products and may use manufactured products.

Examples of commercially available products of the scaly alumina particles include AS-520-A manufactured by Nissan Chemical Industries, Ltd. and Cataloid-AS manufactured by JGC Catalysts and Chemicals Ltd.

As shown in FIG. 2, the low refractive index layer formed on the high refractive index layer as a discontinuous layer has fine unevenness on the surface thereof, and the outermost surface in the first main surface 21a side of the transparent substrate 20 with an antiglare film, that is, an outermost surface 24a of the antiglare film 24, is a shape having fine unevenness. As described above, the present inventors have found that when the main surfaces of the flat plate-shaped high refractive index particles are distributed in the low refractive index layer 22 in the state of inclining to the first main surface 21a of the transparent substrate 20 and RSm of the outermost surface in the first main surface 21a side of the transparent substrate 20 with an antiglare film is small, high antiglare property and low sparkle can be achieved.

The RSm of the outermost surface (that is, the outermost surface 24a of the antiglare film 24) in the first main surface 21a side of the transparent substrate 20 with an antiglare film shown in FIG. 2 is 50 μm or less. High antiglare property and low sparkle can be achieved by this. The RSm of the outermost surface in the first main surface 21a side of the transparent substrate 20 with an antiglare film is preferably 30 μm or less and more preferably 20 μm or less. The reason for this is that sparkle due to surface shape is suppressed as the RSm of the outermost surface in the first main surface 21a side of the transparent substrate 20 with an antiglare film is small.

Furthermore, the RSm of the outermost surface in the first main surface 21a side of the transparent substrate 20 with an antiglare film is preferably 0.8 μm or more and more preferably 5 μm or more. The reason for this is that when the RSm is less than 0.8 μm that is visible light wavelength edge, visible light is difficult to be diffracted and antiglare property is difficult to be developed.

The average length RSm of elements of a roughness curve of the antiglare film 24 surface can be measured according to the method defined in JIS B0601-2001.

Specifically, in the transparent substrate 20 with an antiglare film shown in FIG. 2, among the high refractive index particles constituting the high refractive index layer 23, area ratio of the high refractive index particles having surface inclination to the first main surface 21a of the transparent substrate 21 of 0.5° or less is 15% or less and the RSm of the surface of the antiglare layer 24 is 50 μm or less. Thus, the transparent substrate 20 with an antiglare film can achieve high antiglare property, high visibility and low sparkle.

The antiglare film 24 of the transparent substrate 20 with an antiglare film shown in FIG. 2 can be formed by, for examples, the following procedures.

Coating liquid obtained by mixing flat plate-shaped high refractive index particles (for example, scaly alumina ($Al_2O_3$) particles) with solid particles of low refractive index materials (for example, silicon oxide ($SiO_2$)) together with a matrix agent of low refractive index material (for example, silicon oxide ($SiO_2$)) is applied to the first main surface 21a of the transparent substrate 21 by an electrostatic coating method, and then baked under predetermined temperature conditions. The center of distribution of an angle at which the flat plate-shaped high refractive index particles incline in the matrix of the low refractive index material can be controlled by appropriately selecting a mass ratio between the flat plate-shaped high refractive index particles and the solid particles of the low refractive index material, the diameter of the solid particles of the low refractive index material, and a mass ratio of the flat plate-shaped high refractive index particles and the solid particles of the low refractive index material to the matrix agent of the low refractive index material.

The content of the flat plate-shaped high refractive index particles in the coating liquid is preferably 5 to 50 vol %.

In the second embodiment, the high refractive index layer 23 is a discontinuous layer. The material constituting the discontinuous high refractive index layer 23 has a flat plate shape and is preferably arranged so as not to be parallel to the first main surface 21a of the transparent substrate 21. In the case where the high refractive index is a continuous layer, a part of the top of the convex part and the bottom of the concave part in the uneven part constituting the continuous layer is not avoided from the formation of the part parallel to the main surface of the transparent substrate. For this reason, excellent optical properties are obtained in the second embodiment. In order to make the flat plate-shaped high refractive index material not parallel to the main surface 21a of the transparent substrate 21, fine particles having the same refractive index as the low refractive index layer 22 and having an average diameter smaller than the average diameter (perfect circle conversion) of the flat plate-shaped high refractive index layer are contained.

Third Embodiment

Figure 3:
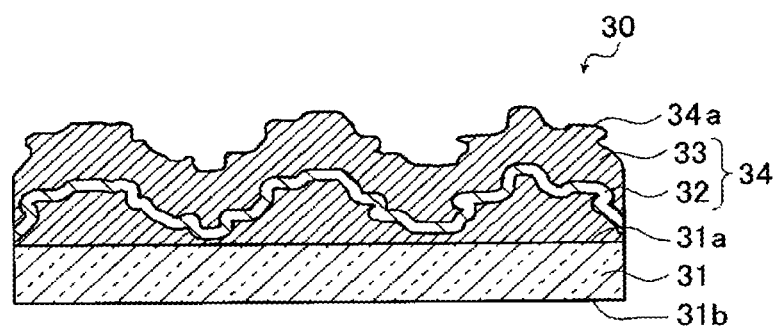
FIG. 3 is a cross-sectional view showing a third embodiment of the transparent substrate with an antiglare film of the present invention.

FIG. 3 is a cross-sectional view schematically showing a third embodiment of the transparent substrate with an antiglare film of the present invention. A transparent substrate 30 with an antiglare film shown in FIG. 3 includes a transparent substrate 31 having a first main surface 31a and a second main surface 31b and an antiglare film 34 formed on the first main surface 31a. The antiglare film 34 consist of a high refractive index layer 33 formed on the first main surface 31a of the transparent substrate 31 and a low refractive index layer 32 formed in the high refractive index layer 33.

The low refractive index layer 32 in the transparent substrate 30 with an antiglare film shown in FIG. 3 is a continuous layer.

In other words, the antiglare layer has a configuration in which the low refractive index layer 12 and high refractive index layer 13 of the antiglare film 14 in the first embodiment are replaced with each other, and has the same effect as in the first embodiment.

Therefore, other than the descriptions relating to the refractive index of each layer, the difference in mutual refractive indexes and the constituent material of each layer, the descriptions relating to the low refractive index layer 12 and high refractive index layer 13 in the first embodiment should be replaced with the descriptions relating to the high refractive index layer 33 and low refractive index layer 32, respectively. The descriptions relating to the refractive index of each layer, the difference in mutual refractive indexes and the constituent material of each layer are that the descriptions relating to the low refractive index layer 12 and high refractive index layer 13 in the first embodiment should be replaced with the descriptions relating to the low refractive index layer 32 and the high refractive index layer 33, respectively.

In this case, the refractive index $n_{high}$ at a wavelength of 550 nm is 1.8 or less. The reason for this is that when the refractive index $n_{high}$ of the high refractive index layer 33 is equal to or lower than the upper limit, visible light transmittance is increased. The refractive index $n_{high}$ at a wavelength of 550 nm is preferably 1.6 or less and more preferably 1.5 or less.

The refractive index $n_{high}$ at a wavelength of 550 nm is 1.4 or more. The reason for this is that any reflectance is easy to be designed as the difference to the refractive index $n_{low}$ at a wavelength of 550 becomes large. Further reason is that in the case where the high refractive index layer 33 is less than 1.4, a material that can be used as the low refractive index 32 is extremely limited to, for example, $MgF_2$ (refractive index 1.38). The refractive index $n_{high}$ at a wavelength of 550 nm is more preferably 1.45 or more.

The lower refractive index $n_{low}$ at a wavelength of 550 nm is preferable, and 1.4 or less is preferred.

The same effect as in the first embodiment is expressed even in the third embodiment. The third embodiment is that as compared with the first embodiment, the difference in refractive index at the interface between the high refractive index 33 and the air is increased and an absolute value of surface reflection scattering that is scattering of an incident light in the air and the outermost surface in the first main surface 31a side of the transparent substrate 30 is increased. In the case where surface reflection scattering is desired to suppress, the first embodiment is preferred.

Fourth Embodiment

FIG. 4 is a cross-sectional view schematically showing a fourth embodiment of the transparent substrate with an antiglare film of the present invention. The transparent substrate 40 with an antiglare film shown in FIG. 4 includes a transparent substrate 41 having a first main surface 41a and a second main surface 41b, and an antiglare film 44 formed on the first main surface 41a of the transparent substrate 41, wherein the antiglare film 44 consists of a high refractive index layer 43 formed on the first main surface 41a of the transparent substrate 41 and a low refractive index layer 42 formed in the high refractive index layer 43.

The low refractive index layer 42 in the transparent substrate 40 with an antiglare film shown in FIG. 4 is a discontinuous layer.

In other words, the antiglare layer has a configuration that the low refractive index layer 22 and high refractive index layer 23 of the antiglare film 24 in the second embodiment are replaced with each other. Therefore, other than the descriptions relating to the refractive index of each layer, the difference in mutual refractive indexes and the constituent material of each layer, the descriptions relating to the low refractive index layer 22 and high refractive index layer 23 in the second embodiment should be replaced with the descriptions relating to the high refractive index layer 43 and low refractive index layer 42, respectively. The descriptions relating to the refractive index of each layer, the difference in mutual refractive indexes and the constituent material of each layer are that the descriptions relating to the low refractive index layer 22 and high refractive index layer 23 in the transparent substrate 20 with an antiglare film shown in FIG. 2 should be replaced with the descriptions relating to the low refractive index layer 42 and the high refractive index layer 43, respectively.

The same effect as in the second embodiment is expressed even in the fourth embodiment. The fourth embodiment is that as compared with the second embodiment, the difference in refractive index at the interface between the high refractive index layer 43 and the air is increased and an absolute value of surface reflection scattering is increased. In the case where surface reflection scattering is desired to suppress, the fourth embodiment is preferred.

In the fourth embodiment, the low refractive index layer 42 is a discontinuous layer. The material constituting the discontinuous low refractive index layer 42 is flat plate-shaped and preferably arranged so as not to be parallel to the first main surface 41a of the transparent substrate 41. In the case where the low refractive index is a continuous layer, a part of the top of the convex part and the bottom of the concave part in the uneven part constituting the continuous layer is not avoided from the formation of the part parallel to the main surface of the transparent substrate. For this reason, excellent optical properties are obtained in the fourth embodiment. In order to make the flat plate-shaped low refractive index material not parallel to the main surface 41a of the transparent substrate 41, fine particles having the same refractive index as the low refractive index layer and having an average diameter smaller than the average diameter (perfect circle conversion) of the flat plate-shaped high refractive index layer are contained.

<Display Device>

Figure 8:
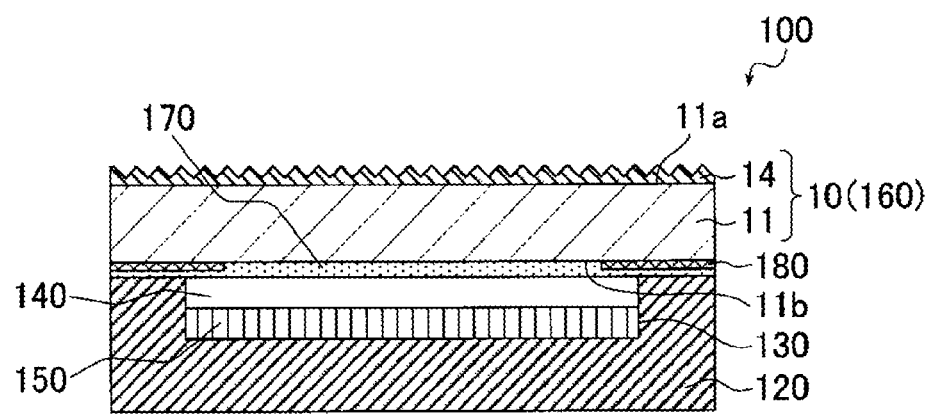
FIG. 8 is a cross-sectional view of a display device using the transparent substrate with an antiglare film of the present invention.

FIG. 8 is a cross-sectional view of a display device 100 using the transparent substrate 10 with an antiglare film of the first embodiment as a cover member 160. As shown in FIG. 8, the display device 100 has a casing 120 having a concave part 130, and a display panel 140 such as a liquid crystal panel, a backlight 150 and the like are arranged in the concave part 130. In the transparent substrate 10 with an antiglare film, the second main surface 11b side of the transparent substrate 11 is laminated on the display panel 140 and the casing 120 via an adhesive layer 170. A printed layer 180 having a light-shielding ink printed thereon is formed on the periphery of the second main surface 11b of the transparent substrate 11. The display device 100 may be further provided with a deflection substrate, a pixel substrate, a color filter and the like.

Furthermore, the transparent substrate 20 with an antiglare film of the second embodiment, the transparent substrate 30 with an antiglare film of the third embodiment and the transparent substrate 40 with an antiglare film of the fourth embodiment may be used as the cover member 160.

As described above, according to the transparent substrates 10, 20, 30 and 40 with an antiglare film shown in FIGS. 1, 2, 3 and 4, high antiglare property, high visibility and low sparkle can be achieved.

(Antiglare Property)

The antiglare property was evaluated using reflection image diffusiveness index value R.

(Reflection Image Diffusiveness Index Value R)

Measurement method of the reflection image diffusiveness index value R is described below by reference to FIG. 5 and FIG. 6.

Figure 5:
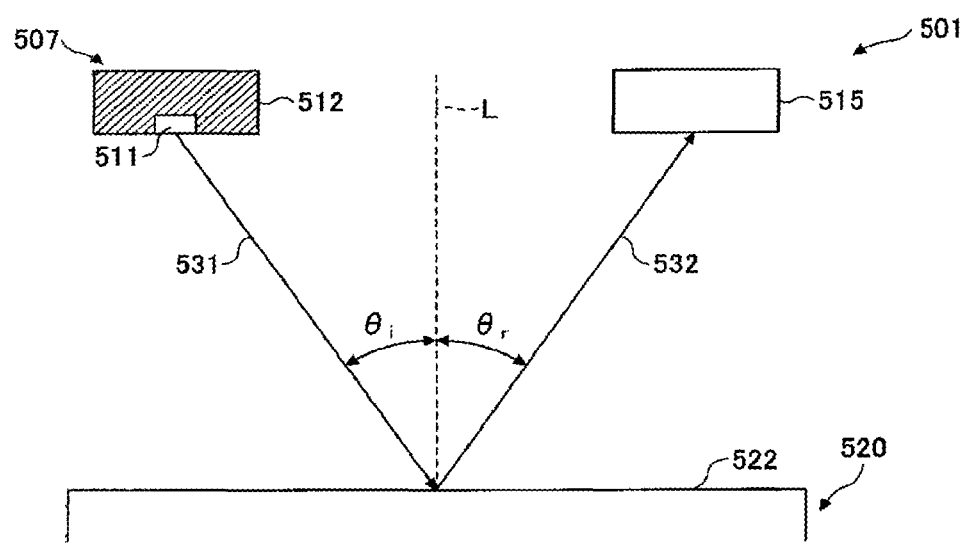
FIG. 5 is a view illustrating a measurement method of a reflection image diffusiveness index.

FIG. 5 schematically shows an example of a measuring apparatus used in measuring reflection image diffusiveness index value R of a cover member.

As shown in FIG. 5, a measuring apparatus 501 has a linear light source device 507 and a surface brightness measuring instrument 515.

The linear light source device 507 has a light source 511 and a black flat plate 512 around the light source. In FIG. 5, the light source 511 is a linear light source extending in a direction vertical to a paper surface, and is arranged in a slit-shaped opening provided in the center of the black flat plate 512.

The surface brightness measuring instrument 515 is arranged on a plane perpendicular to a longitudinal axis of the light source 511 and passing nearly the center of the light source 511. Therefore, the surface brightness measuring instrument 515 is arranged so as to face the light source 511 at nearly the center of the light source 511 along the longitudinal axis. The distance between the surface brightness measuring instrument 515 and the light source 511 is about 60 mm.

The surface brightness measuring instrument 515 focuses on the image of the linear light source device 507 reflected on an outer surface 522 of a transparent substrate 520 with an antiglare film.

The transparent substrate 520 with an antiglare film to be measured is arranged in the measuring apparatus 501 such that the outer surface 522 with an antiglare film faces the side of the linear light source device 507 and the surface brightness measuring instrument 515. In the case of the transparent substrate with an antiglare film according to Examples 1 and 2 and Comparative Examples 1 and 2, the outer surface 522 is an outer surface with an antiglare film. The opposite surface facing the surface with an antiglare film is sufficiently blacked out using Mitsubishi Paint Marker PX-30 (manufacture by Mitsubishi Pencil Co., Ltd.). The reason for this is to eliminate reflection from back of transparent substrate with antiglare film/air interface when measuring.

In measuring reflection image diffusiveness index value R of the cover member 520 using the measuring apparatus 501, light is emitted toward the outer surface 522 of the transparent substrate 520 with an antiglare film from the light source 511 of the linear light source device 507.

The light emitted from the linear light source device 507 enters the outer surface 522 of the transparent substrate 520 with an antiglare film at an incident angle $\theta_i$. Furthermore, the light is reflected and/or scattered on the outer surface 522 of the transparent substrate 520 with an antiglare film at a reflection angle $\theta_r$, and enters the surface brightness measuring instrument 515.

For example, FIG. 5 shows the state that a first incident light 531 from the linear light source device 507 is regularly reflected on the outer surface 522 to become a reflected light 532, and then enters the surface brightness measuring instrument 515.

In this case, $\theta_r-\theta_i=0°$ is established between the incident angle $\theta_i$ of the first incident light 531 and the reflection angle $\theta_r$ of the first reflected light 532.

In such a regular reflection, particularly in the case of incident angle $\theta_i$=reflection angle $\theta_r$=5.7°, the brightness of the first reflected light 532 measured with the surface brightness measuring instrument 515 is defined as $R_1$. However, because an error is actually included, the brightness $R_1$ is the brightness of the first reflected light 532 measured in $\theta_r-\theta_i=5.7°\pm0.1°$.

Figure 6:
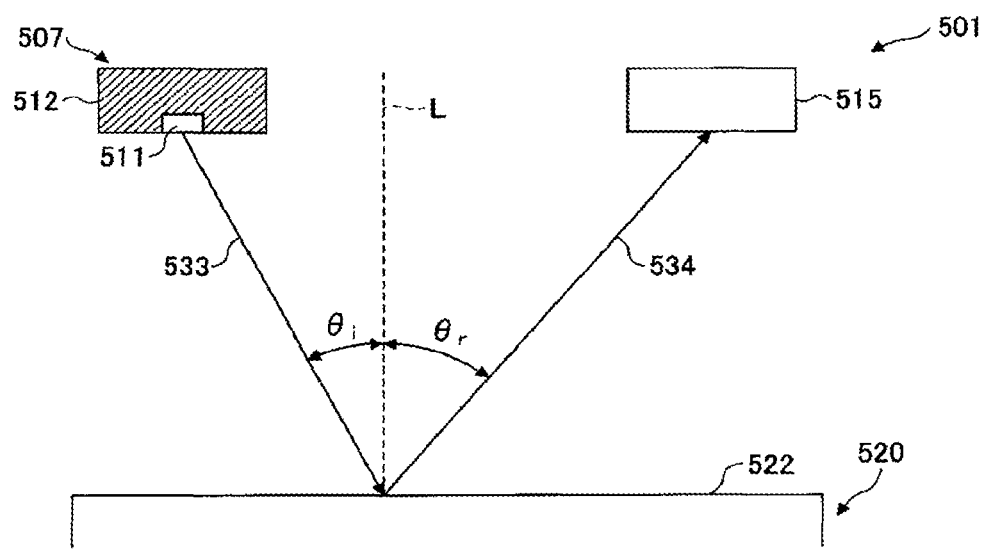
FIG. 6 is a view illustrating a measurement method of a reflection image diffusiveness index

On the other hand, FIG. 6 shows the state that a second incident light 533 from the linear light source device 507 is scattered and reflected on the outer surface 522 to become a second reflected light 534, and enters the surface brightness instrument 515.

In particular, the brightness of the second reflected light 534 measured in the surface brightness measuring instrument 515 in the case where $\theta_r-\theta_i=0.5°\pm0.1°$ is established between the incident angle $\theta_i$ of the second incident light 533 and the reflection angle $\theta_r$ of the second reflected light 534 is defined as $R_2$.

The brightness of the second reflected light 534 measured in the surface brightness measuring instrument 515 in the case where $\theta_r-\theta_i=-0.5°\pm0.1°$ is established between the incident angle $\theta_i$ of the second incident light 533 and the reflection angle $\theta_r$ of the second reflected light 534 is defined as $R_3$.

The reflection image diffusiveness index value R of the cover material 520 is calculated by the following formula (1) using brightness $R_1$, $R_2$ and $R_3$ thus obtained.

$$\text{Reflection image diffusiveness index value } R=(R_2+R_3)/(2\times R_1) \quad (1)$$

It is confirmed that the reflection image diffusiveness index value R shows good correlation with judgement results of antiglare property by visual inspection with an observer. For example, the transparent substrate 520 with an antiglare film showing small reflection image diffusiveness index value R (close to 0) has poor antiglare property, and on the other hand, the transparent substrate 520 with an antiglare film showing large reflection image diffusiveness index value R (large as being close to 1) has good antiglare property.

The measurement can be carried out by using, for example, an apparatus SMS-1000 manufactured by DM&S. In the case of using this apparatus, C1614A lens having a focal length of camera lens of 16 mm is used in a diaphragm of 5.6. The distance from the outer surface 522 to the camera lens is about 300 mm, and imaging scale is set to a range of 0.0276 to 0.0278.

In this apparatus, the size of an opening of a slit formed in the black flat plate 512 of the linear light source device 507 is 101 mm×1 mm.

The transparent substrates 10, 20, 30 and 40 with an antiglare film shown in FIG. 1, FIG. 2, FIG. 3 and FIG. 4 have the reflection image diffusiveness index value R of preferably 0.1 or more and more preferably 0.2 or more. When the reflection image diffusiveness index value R of the transparent substrates 10 and 20 with an antiglare film is 0.1 or more, excellent antiglare property is exhibited when used in an image display device.

Furthermore, the reflection image diffusiveness index value R is preferably close to 1.0 from the standpoint of the increase of antiglare property.

In the present description, sparkle index value (Anti-Sparkle): S measured by the following procedures is used as an index of sparkle.

The sparkle index value (Anti-Sparkle) shows the degree that bright point unevenness generated by that light (image) from a display image is scattered when transmitting a glass plate and light scattered mutually interferes is detected, and it is confirmed that the sparkle index value has good correlation with judgment results of sparkle by visual inspection by an observer. For example, a glass plate having small sparkle index value S shows remarkable sparkle, and on the other hand, a glass plate having large sparkle index value S tends to suppress sparkle.

(Sparkle Index Value S)

Figure 9:
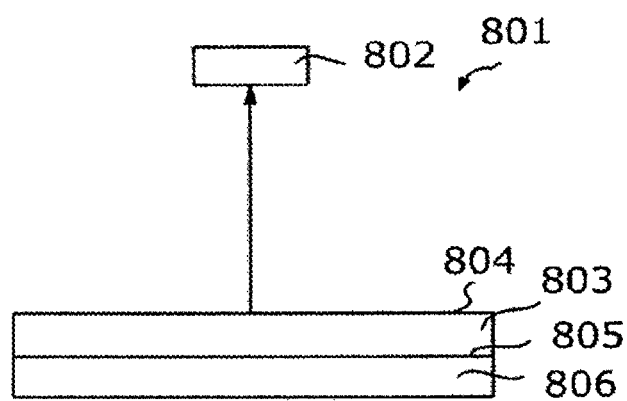
FIG. 9 is a view illustrating a measurement method of a sparkle index value S of the transparent substrate.

Measurement method of the sparkle index value (Anti-Sparkle): S of a transparent substrate is described using FIG. 9.

For measuring the sparkle index value S, a display device 806 (iPad, third generation (registered trademark); resolution 264 ppi) is prepared. The display device may be provided with a cover for the purpose of preventing breakage on the display surface side.

A sample to be measured, that is, a transparent substrate 803 with an antiglare film (or a transparent substrate having antiglare function by antiglare processing), is arranged on the display surface side of the display device. In the case where an antiglare film is formed on a first main surface 804 that is one main surface of the transparent substrate 803 with an antiglare film, the transparent substrate 803 with an antiglare film is arranged on the display surface side of the display device such that the first main surface 804 becomes the side opposite the display device 806 (detector 802 side). In other words, a second main surface 805 that is another main surface is arranged on the display device 806.

The degree of sparkle of the transparent substrate 803 with an antiglare film is image-analyzed using an analyzer (SMS-1000; manufactured by Display-Messtechnik & Systeme (DM&S)) in the state that the display device is turned on and an image is displayed. Sparkle Sa expressed as Sparkle value is obtained by this.

It is preferred in the measurement that green monochromatic image constituted of RGB (0, 255, 0) is displayed on the entire display surface of the display device 806. The reason for this is to decrease as possible the influence such as difference in appearance due to the difference of display color. Distance d between a solid-state image sensor and a transparent substrate having antiglare function was 540 mm. The distance d corresponds to r=10.8 in terms of distance index r.

The distance index r used herein is represented by the following formula using focal length f of the solid-state image sensor and the distance d between the solid-state image sensor and the transparent substrate:

Distance index r=(Distance d between solid state image sensor and transparent substrate with antiglare film)/(Focal length f of solid state image sensor)

The same measurement is carried out in a reference sample. The reference sample is a glass substrate (VRD140 glass; manufactured by AGC Glass Europe) having the same thickness as the transparent substrate 803 with an antiglare film.

Sparkle value obtained is designated as sparkle $S_s$.

Sparkle index value S of the transparent substrate 803 with antiglare film is calculated from $S_a$ and $S_s$ thus obtained by the following formula (2).

Sparkle index value $S=1-(S_a/S_s)$ (2)

It is confirmed that the sparkle index value (Anti-Sparkle) S shows good correlation with judgement results of sparkle by visual inspection by an observer. For example, a transparent substrate having small sparkle index value S shows remarkable sparkle, and on the other hand, a transparent substrate having large sparkle index value S tends to suppress sparkle.

In this measurement, 23FM50SP lens having a focal length of 50 mm is preferably used in a diaphragm of 5.6 as the camera lens.

(Visibility Index Value T)

In the present description, visibility index value (Clarity): T measured by the following procedures is used as an index of visibility.

Visibility (Clarity) shows the degree of coincidence of an image obtained as compared with a display image when visually recognizing the display image through a glass plate, and it is confirmed that the visibility shows good correlation with judgement results of visibility (resolution) by visual inspection by an observer. For example, a glass plate showing small value (close to 0) of visibility index value T has poor visibility, and on the other hand, a glass plate showing large visibility index value T has good visibility. Therefore, the visibility index value T can be used as a quantitative index in judging visibility of a glass plate.

The visibility index value T was measured using a goniophotometer GC5000L manufactured by Nippon Denshoku Industries Co., Ltd in the following procedures. First light was emitted from the side opposite the main surface having formed thereon an antiglare film of the transparent substrate with an antiglare film in a direction of angle θ=0°±0.5° (hereinafter referred as to a "direction of angle 0°") when a direction parallel to a thickness direction of the transparent substrate with an antiglare film was angle θ=0°. The first light transmitted the transparent substrate with an antiglare film, and the transmitted light from the main surface having an antiglare film formed thereon is received to measure its brightness. The brightness was designated as "brightness of 0° transmitted light".

The same operation was carried out by changing the angle θ receiving the light emitted from the main surface having an antiglare film formed thereon in a range of from −30° to 30°. By this operation, brightness distributions of the light transmitted the transparent substrate having an antiglare film and emitted from the main surface having an antiglare film formed thereon were measured and totalized. The total was designated as "brightness of total transmitted light".

The visibility index value (Clarity): T was calculated from the following formula (3).

Visibility index value (Clarity): T=Brightness of transmitted light/brightness of total transmitted light (3)

It is confirmed that the visibility index value (Clarity): T correlates with judgement results of resolution by visual inspection by an observer and shows the behavior close to human visuality. For example, a transparent substrate having small visibility index value T (close to 0) has poor resolution, and on the other hand, a transparent substrate having large visibility index value T has good resolution. Therefore, the visibility index value T can be used as a quantitative index in judging resolution of a transparent substrate with an antiglare film.

EXAMPLES

The present invention is described below by reference of specific examples, but is not limited to those examples unless departing from the spirit of the present invention.

Example 1

In Example 1, the transparent substrate 10 with an antiglare film shown in FIG. 1 was prepared by the following procedures. Constituent material of the low refractive index layer 12 was silicon dioxide ($SiO_2$, $n_{low}$=1.46) and constituent material of the high refractive index layer 13 was titanium dioxide ($TiO_2$, $n_{high}$=2.47).

Chemically strengthening glass (unstrengthened Dragontrail (registered trademark) manufactured by AGC Inc., glass substrate having refractive index: 1.51, size: 100 mm vertical×100 mm horizontal, and thickness: 1.1 mm) was provided as the transparent substrate 11. The surface of the glass was washed with sodium hydrogen carbonate water, and then rinsed with ion-exchanged water, followed by drying.

The silicon dioxide ($SiO_2$) layer as the low refractive index layer 12 was formed by an electrostatic coating method.

Coating liquid for forming the silicon dioxide ($SiO_2$) layer was prepared by the following procedures.

Tetraethoxysilane, bistrimethyoxysilylethane and SUN-LOVELY manufactured by AGC Si-Tech Co., Ltd. were added to SOLMIX (registered trademark) AP-11 (manufactured by Japan Alcohol Trading Co., Ltd. stirred using a magnetic stirrer such that those are 87.6:6.4:6 in a solid content ratio in terms of $SiO_2$ and a solid content concentration is 3.11 mass % in terms of $SiO_2$. Subsequently, pure water was added so as to be 10.86%, followed by mixing at 25° C. for 30 minutes. Thereafter, a nitric acid aqueous solution having a concentration of 60 mass % was added in an amount of 0.54 mass % based on the amount of a mixed liquid of tetraethoxysilane, bistrimethyoxysilylethane and a liquid medium (AP-11 and pure water), followed by mixing at 60° C. for 60 minutes. Thus, a precursor liquid of a coating liquid for forming the silicon oxide ($SiO_2$) layer was obtained. The precursor liquid was diluted with AP-11 so as to be 0.25 mass %, and a coating liquid for forming the silicon oxide ($SiO_2$) layer was obtained.

Temperature in a coating booth of an electrostatic coating instrument was adjusted within a range of 25±3° C., and humidity therein was adjusted within a range of 50±5%. The transparent substrate 11 already washed, previously heated to 25° C.±3° C. was placed on a chain conveyer of the electrostatic coating instrument through stainless steel plate. While conveying the transparent substrate with the chain conveyer at a constant speed of 3.0 m/min, the coating liquid having a temperature within a range of 25±3° C. was applied to the top surface of the transparent substrate 11 (surface opposite the surface contacted with molten tin when producing by a float process) by an electrostatic coating method under the conditions of number of revolution of cap: 35 krpm, applied voltage: 60 kV, amount of liquid discharged: 19 g/min and shave air pressure: 0.7 MPa, and then baked at 300° C. for 60 minutes in the atmosphere. Thus, a layer including silicon dioxide ($SiO_2$) as a main component was formed. The main component used herein means that 50% or more of the component is contained in the layer. As a result of measuring surface profile of the layer formed with SURFCOM manufactured by Tokyo Seimitsu Co., Ltd., the arithmetic mean roughness Ra was 0.04 μm Furthermore, the maximum height roughness Rz was 0.32 μm, the root mean square roughness Rq was 0.06 μm and RSm was 18 μm.

Titanium dioxide ($TiO_2$) layer (thickness 15 nm) was formed as the high refractive index layer 13 as a continuous layer on the silicon dioxide ($SiO_2$) layer having fine unevenness formed on the surface thereof by a sputtering method. The thickness of the titanium dioxide ($TiO_2$) layer used herein was obtained by measuring the thickness of a flat film deposited on a flat glass simultaneously deposited with a surface profile measuring instrument Dektak 6M manufactured by ULVAC. It was confirmed that the flat film was a continuous film by observing a sample after deposition by cross-sectional SEM observation using FE-SEM (model number S4300) manufactured by Hitachi, Ltd.

Silicon dioxide ($SiO_2$) layer was formed on the titanium dioxide ($TiO_2$) layer by an electrostatic coating method in the same procedures as above, and the transparent substrate 10 with an antiglare film shown in FIG. 1 was prepared. Arithmetic mean roughness Ra and RSm of the surface after preparing was measured with SURFCOM 1500 SD3-12 manufactured by Tokyo Seimitsu Co., Ltd. according to the method defined in JIS B0601-2001. As a result, Ra was 0.07 μm and RSm was 18 μm.

As a result of measuring by the procedures described in the item (Area ratio of portion having surface inclination to first main surface of transparent substrate of 0.5° or less: calculation method 1) described above, the titanium dioxide ($TiO_2$) layer as the high refractive index layer 12 had the area ratio of its portion having surface inclination to the first main surface 11a of the transparent substrate 11 of 0.5° of 2.9%.

The second main surface 11b on which the antiglare film 14 was not formed, of the transparent substrate 11 was sufficiently blacked out by a paint marker PX-30 manufactured by Mitsubishi Pencil Co., Ltd. in order to eliminate reflection at the interface between the second main surface 11b and the air, and then visible light reflectance was measured from the first main surface 11a side of the transparent substrate 10 with an antiglare film. The visible light reflectance measured was 6.6%.

Reflection image diffusiveness index value R of the transparent substrate 10 with an antiglare film measured by the procedures described in the item (Reflection image diffusiveness index value R) described before was 0.26.

Sparkle index value S of the transparent substrate 10 with an antiglare film measured by the procedures described in the item (Sparkle index value S) described before was 0.84.

Visibility index value T of the transparent substrate 10 with an antiglare film measured by the procedures described in the item (Visibility index value T) described before was 0.97.

The ratio of the portion of 0.5° or less measured by cross-sectional SEM by the procedures described in the item (Area ratio of portion having surface inclination to first main surface of transparent substrate of 0.5° or less: calculation method 2) described before was 2.8%.

Ra and RSm measured with cross-sectional SEM by the procedures described in the item (Area ratio of portion having surface inclination to first main surface of transparent substrate of 0.5° or less: calculation method 2) described before were 0.04 μm and 18 μm, respectively.

Comparative Example 1

The same procedures as in the example were carried out, except that titanium dioxide ($TiO_2$) layer as the high refractive index layer 13 was not formed after forming the silicon dioxide ($SiO_2$) layer on the transparent substrate 11 by an electrostatic coating method.

Furthermore, RSm of the antiglare film 14 surface measured according to the method defined in JIS B0601-2001 was 18 μm as same as in the example.

Reflection image diffusiveness index value R of the transparent substrate 10 with an antiglare film was 0.097.

Sparkle index value S of the transparent substrate 10 with an antiglare film was 0.92.

Visibility index value T of the transparent substrate 10 with an antiglare film was 0.98.

Ra and RSm of the transparent substrate 10 with an antiglare film measured with cross-sectional SEM were 0.04 μm and 18 μm, respectively.

Example 2

In Example 2, the transparent substrate 10 with an antiglare film shown in FIG. 1 was prepared by the following procedures. Constituent material of the low refractive index layer 12 was silicon dioxide ($SiO_2$, $n_{low}$=1.46), and constituent material of the high refractive index 13 as a continuous layer was titanium dioxide ($TiO_2$, $n_{high}$=2.47).

Chemically strengthening glass (unstrengthened Dragontrail (registered trademark) manufactured by AGC Inc., glass substrate having refractive index: 1.51, size: 100 mm vertical×100 mm horizontal, and thickness: 1.1 mm) was provided as the transparent substrate 11. The surface of the glass was washed with sodium hydrogen carbonate water, and then rinsed with ion-exchanged water, followed by drying.

Fine unevenness was formed on one surface of the glass by an etching method. Specifically, a protective film was adhered to the back surface of a glass substrate. The glass substrate was immersed in a frost treating liquid containing 2 wt % hydrogen fluoride and 3 wt % potassium fluoride for 3 minutes, the glass substrate was washed, and the glass substrate was immersed in an aqueous solution containing 7.5 wt % hydrogen fluoride and 7.5 wt % hydrogen chloride for 7 minutes. Thus, fine unevenness was formed on the glass surface. Arithmetic mean roughness Ra of the surface formed and RSm were measured with SURFCOM 1500SD3-12 manufactured by Tokyo Seimitsu Co., Ltd. according to the method defined in JIS B0601-2001. As a result, Ra was 0.064 μm and RSm was 14 μm.

Next, titanium dioxide (TiO$_2$) layer (thickness 15 nm) as the high refractive index layer of a continuous layer was formed on the glass substrate having fine unevenness formed on the surface thereof by a sputtering method.

Next, silicon oxide (SiO$_2$) layer was formed on the titanium dioxide (TiO$_2$) layer by an electrostatic coating method in the same procedures as in Example 1, and the transparent substrate 10 with an antiglare film shown in FIG. 1 was prepared. Arithmetic mean roughness Ra of the surface after preparing and RSm were measured with SURF-COM 1500SD3-12 manufactured by Tokyo Seimitsu Co., Ltd. according to the method defined in JIS B0601-2001. As a result, Ra was 0.10 μm and RSm was 15 μm.

As a result of measuring by the procedures described in the item ((Area ratio of portion having surface inclination to first main surface of transparent substrate of 0.5 or less: calculation method 1), the titanium dioxide (TiO$_2$) layer as the high refractive index layer 12 was that the area ratio of its portion having surface inclination to the first main surface 11a of the transparent substrate 11 of 0.5° or less was 2.9%.

The second main surface 11b on which the antiglare film 14 was not formed, of the transparent substrate 11 was sufficiently blacked out by a paint marker PX-30 manufactured by Mitsubishi Pencil Co., Ltd. in order to eliminate reflection at the interface between the second main surface 11b and the air, and visible light transmittance was measured. The visible light reflectance measured was 6.1%.

Reflection image diffusiveness index value R of the transparent substrate 10 with an antiglare film measured by the procedures described in the item (Reflection image diffusiveness index value R) described before was 0.42.

Sparkle index value S of the transparent substrate 10 with an antiglare film measured by the procedures described in the item (Sparkle index value S) described before was 0.87.

Visibility index value T of the transparent substrate 10 with an antiglare film measured by the procedures described in the item (Visibility index value T) described before was 0.98.

Ratio of the portion of 0.5° or less measured by cross-sectional SEM by the procedures described in the item (Area ratio of portion having surface inclination to first main surface of transparent substrate of 0.5° or less: calculation method 2) described before was 2.9%.

Ra and RSm measured with cross-sectional SEM by the procedures described in the item (Area ratio of portion having surface inclination to first main surface of transparent substrate of 0.5° or less: calculation method 2) were 0.06 μm and 14 μm, respectively.

Comparative Example 2

The same procedures as in Example 2 were carried out, except that TiO$_2$ layer was not formed after forming fine unevenness on the surface by etching one surface of the glass by an etching method under the same conditions as in Example 2.

Arithmetic mean roughness of the surface Ra after preparing and RSm were measured with SURFCOM 1500SD3-12 manufactured by Tokyo Seimitsu Co., Ltd. according to the method defined in JIS B0601-2001. As a result, Ra was 0.101 μm and RSm was 15 μm.

Reflection image diffusiveness index value R of the transparent substrate 10 with an antiglare film was 0.19.

Sparkle index value S of the transparent substrate 10 with an antiglare film was 0.91.

Visibility index value T of the transparent substrate 10 with an antiglare film was 0.97.

Ra and RSm of the transparent substrate 10 with an antiglare film measured with cross-sectional SEM were 0.10 μm and 15 μm, respectively.

Although the present invention has been described in detail and by reference to the specific embodiments, it is apparent to one skilled in the art that various modifications or changes can be made without departing the spirit and scope of the present invention. This application is based on Japanese Patent Application No. 2018-020773 filed Feb. 8, 2018, the disclosure of which is incorporated herein by reference.

REFERENCE SIGNS LIST 10, 20, 30, 40: Transparent substrate with antiglare film
11, 21, 31, 41: Transparent substate
11a, 21a, 31a, 41a: First main surface
11b, 21b, 31b, 41b: Second main surface
12, 22, 32, 42: Low refractive index layer
13, 23, 33, 43: High refractive index layer
14, 24, 34, 44: Antiglare film
14a, 24a, 34a, 44a: Outermost surface of antiglare film
100: Display device
120: Casing
130: Concave part
140: Display panel
150: Backlight
160: Cover member
170: Adhesive layer
180: Printed layer
Xo: Square data
X1, X2, X3: Inverted and rotated data
501: Measuring apparatus
507: Linear light source device
511: Light source
512: Black flat plate
515: Surface brightness measuring instrument
520: Transparent substrate with antiglare film
522: Outer surface
531: First incident light
532: First reflected light
533: Second incident light
534: Second reflected light
803: Transparent substrate with antiglare film
804: First main surface
805: Second main surface
806: Display device

The invention claimed is:
1. A transparent substrate with an antiglare film, comprising a transparent substrate having a first main surface and a second main surface, and an antiglare film formed on the first main surface,
wherein the antiglare film comprises a low refractive index layer formed on the first main surface of the transparent substrate and a high refractive index layer formed in the low refractive index layer and having a refractive index different from a refractive index of the low refractive index layer,
the low refractive index layer has $n_{low}$ of 1.4 to 1.8 in which the refractive index of the low refractive index layer at a wavelength of 550 nm is $n_{low}$,
the high refractive index layer has $n_{high}$ at least 0.5 higher than the $n_{low}$ in which the refractive index of the high refractive index layer at a wavelength of 550 nm is $n_{high}$, the high refractive index layer has an area ratio of its portion where a surface inclination to the first main surface of the transparent substrate is 0.5° or less of 15% or less, an average length RSm of elements of a roughness curve of an outermost surface on a first main surface side of the transparent substrate with an antiglare film is 50 μm or less, the low refractive index layer comprises at least one selected from the group consisting of silicon oxide ($SiO_2$), titanium oxide ($TiO_2$), niobium pentoxide ($Nb_2O_5$), tantalum pentoxide ($Ta_2O_5$), silicon nitride ($Si_3N_4$), alumina ($Al_2O_3$), aluminum nitride (AlN), zinc oxide (ZnO), and tin oxide ($SnO_2$).

2. The transparent substrate with an antiglare film according to claim 1, wherein the high refractive index layer has the refractive index $n_{high}$ at a wavelength of 550 nm of 1.8 or more.

3. The transparent substrate with an antiglare film according to claim 1, wherein the high refractive index layer comprises two or more layers.

4. The transparent substrate with an antiglare film according to claim 1, wherein visible light reflectance measured from the first main surface side with the second main surface of the transparent substrate blacked out is 0.2 to 8%.

5. The transparent substrate with an antiglare film according to claim 1, wherein a value obtained by subtracting a total of an average value of reflectance (visible light reflectance) at a wavelength of 380 to 780 nm at an interface between the second main surface and the air and an average value of reflectance (visible light reflectance) at a wavelength of 380 to 780 nm at an interface between the first main surface side of the transparent substrate and the air from an average value of reflectance (visible light reflectance) at a wavelength of 380 to 780 nm measured from the first main surface side is 0.2 to 4%, where the average value of reflectance (visible light reflectance) at a wavelength of 380 to 780 nm measured from the first main surface side is an actual measured value measured according to JIS R3106, and the average value of reflectance (visible light reflectance) at a wavelength of 380 to 780 nm at the interface between the second main surface and the air and the average value of reflectance (visible light reflectance) at a wavelength of 380 to 780 nm at the interface between the first main surface side of the transparent substrate and the air are optically calculated values in a configuration of laminating on an ideally flat surface in the same thickness and the same product nk of a refractive index and an attenuation coefficient.

6. A display device having a structure comprising the transparent substrate with an antiglare film according to claim 1 as a cover member and a display panel adhered to the second main surface of the transparent substrate via an adhesive layer.

7. The transparent substrate with an antiglare film according to claim 1, wherein the high refractive index layer is a discontinuous layer.

8. A transparent substrate with an antiglare film, comprising a transparent substrate having a first main surface and a second main surface, and an antiglare film formed on the first main surface, wherein the antiglare film comprises a high refractive index layer formed on the first main surface of the transparent substrate and a low refractive index layer formed in the high refractive index layer and having a refractive index different from a refractive index of the high refractive index layer, the high refractive index layer has $n_{high}$ of 1.4 to 1.8 in which the refractive index of the high refractive index layer at a wavelength of 550 nm is $n_{high}$, the low refractive index layer has $n_{low}$ at least 0.5 lower than the $n_{high}$, in which the refractive index of the low refractive index layer at a wavelength of 550 nm is $n_{low}$.

the low refractive index layer has an area ratio of its portion where a surface inclination to the first main surface of the transparent substrate is 0.5° or less of 15% or less, an average length RSm of elements of a roughness curve of an outermost surface on a first main surface side of the transparent substrate with an antiglare film is 50 μm or less, the high refractive index layer comprises at least one selected from the group consisting of titanium dioxide ($TiO_2$), niobium pentoxide ($Nb_2O_5$), tantalum pentoxide ($Ta_2O_5$), silicon nitride (SiN), alumina ($Al_2O_3$), aluminum nitride (AlN), zinc oxide (ZnO), tin dioxide ($SnO_2$), and silicon oxide ($SiO_2$).

9. The transparent substrate with an antiglare film according to claim 8, the low refractive index layer has the refractive index $n_{low}$ at a wavelength of 550 nm of 1.4 or less.

10. The transparent substrate with an antiglare film according to claim 8, wherein a main component of the low refractive index layer is silica.

11. The transparent substrate with an antiglare film according to claim 8, wherein the low refractive index layer comprises two or more layers.

12. The transparent substrate with an antiglare film according to a claim 8, wherein visible light reflectance measured from the first main surface side with the second main surface of the transparent substrate blacked out is 0.2 to 8%.

13. The transparent substrate with an antiglare film according to claim 8, wherein a value obtained by subtracting a total of an average value of reflectance (visible light reflectance) at a wavelength of 380 to 780 nm at an interference between the second main surface and the air and an average value of reflectance (visible light reflectance) at a wavelength of 380 to 780 nm at an interface between the first main surface side of the transparent substrate and the air from an average value of reflectance (visible light reflectance) at a wavelength of 380 to 780 nm measured from the first main surface side is 0.2 to 4%, where the average value of reflectance (visible light reflectance) at a wavelength of 380 to 780 nm measured from the first main surface side is an actual measured value measured according to JIS R3106, and the average value of reflectance (visible light reflectance) at a wavelength of 380 to 780 nm at the interface between the second main surface and the air and the average value of reflectance (visible light reflectance) at a wavelength of 380 to 780 nm at the interface between the first main surface side of the transparent substrate and the air are optically calculated values in a configuration of laminating on an ideally flat surface in the same thickness and the same product nk of a refractive index and an attenuation coefficient.

14. A display device having a structure comprising the transparent substrate with an antiglare film according to claim 8 as a cover member and a display panel adhered to the second main surface of the transparent substrate via an adhesive layer.

15. The transparent substrate with an antiglare film according to claim 8, wherein the low refractive index layer is a discontinuous layer.

16. A transparent substrate with an antiglare film, comprising a transparent substrate having a first main surface and a second main surface, and an antiglare film formed on the first main surface,
wherein the antiglare film comprises a low refractive index layer formed on the first main surface of the transparent substrate and a high refractive index layer formed in the low refractive index layer and having a refractive index different from a refractive index of the low refractive index layer,
the low refractive index layer has $n_{low}$ of 1.4 to 1.8 in which the refractive index of the low refractive index layer at a wavelength of 550 nm is $n_{low}$,
the high refractive index layer has $n_{high}$ at least 0.5 higher than the $n_{low}$ in which the refractive index of the high refractive index layer at a wavelength of 550 nm is $n_{high}$,
in a cross-sectional SEM image, when a width of 10 μm length parallel to the main surface of the transparent substrate is observed, SEM images in which an observation region has been continuously slid sideways are photographed, and 40 or more photographs obtained are arranged to make a sampling length of 400 μm, lengths obtained by projecting portions where an inclination to the main surface is 0.5° or less in the high refractive index layer to a line parallel to the main surface of the transparent substrate are measured and these lengths are added up, a proportion of a total of the lengths to the sampling length of 400 μm is 15% or less, an arithmetic mean roughness Ra obtained from a two-dimensional profile of the high refractive index layer is 0.01 μm or more and 0.4 μm or less, and an average length RSm of elements of a roughness curve of an outermost surface on a first main surface side is 0.8 μm or more and 50 μm or less,
the low refractive index layer comprises at least one selected from the group consisting of silicon oxide ($SiO_2$), titanium oxide ($TiO_2$), niobium pentoxide ($Nb_2O_5$), tantalum pentoxide ($Ta_2O_5$), silicon nitride ($Si_3N_4$), alumina ($Al_2O_3$), aluminum nitride (AlN), zinc oxide (ZnO), and tin oxide ($SnO_2$).

17. The transparent substrate with an antiglare film according to claim 16, wherein the high refractive index layer is a discontinuous layer.

* * * * *